United States Patent
Borhan et al.

(10) Patent No.: US 11,603,113 B2
(45) Date of Patent: Mar. 14, 2023

(54) TELEMETRY PREDICTIVE CONTROL FOR VEHICLE OPERATIONS

(71) Applicant: Cummins Inc., Columbus, IN (US)

(72) Inventors: Hoseinali Borhan, Bloomington, IN (US); Edmund P. Hodzen, Columbus, IN (US)

(73) Assignee: Cummins Inc., Columbus, IN (US)

( * ) Notice: Subject to any disclaimer, the term of this patent is extended or adjusted under 35 U.S.C. 154(b) by 148 days.

(21) Appl. No.: 16/682,586

(22) Filed: Nov. 13, 2019

(65) Prior Publication Data

US 2020/0156658 A1 May 21, 2020

Related U.S. Application Data

(60) Provisional application No. 62/767,938, filed on Nov. 15, 2018.

(51) Int. Cl.
*B60W 50/14* (2020.01)
*G01C 21/34* (2006.01)
*B60W 40/06* (2012.01)
*B60W 50/00* (2006.01)

(52) U.S. Cl.
CPC ............ *B60W 50/14* (2013.01); *B60W 40/06* (2013.01); *G01C 21/3469* (2013.01); *B60W 2050/0075* (2013.01); *B60W 2050/146* (2013.01); *B60W 2552/00* (2020.02); *B60W 2555/20* (2020.02); *B60W 2556/45* (2020.02)

(58) Field of Classification Search
CPC ......... B60W 50/14; B60W 2050/0075; B60W 2555/20; B60W 2556/45; B60W 2050/146; B60W 40/06; B60W 2552/00; B60W 20/12; B60W 2556/55; B60W 20/13; B60W 20/16; B60K 6/46; B60K 2006/4825; B60K 6/48; G01C 21/3676; G01C 21/3492; G01C 21/3469; Y02T 10/62

See application file for complete search history.

(56) References Cited

U.S. PATENT DOCUMENTS

| | | | | |
|---|---|---|---|---|
| 5,483,927 A | * | 1/1996 | Letang | ............... F02D 41/1498 123/41.12 |
| 6,067,489 A | * | 5/2000 | Letang | ................... F01P 7/081 123/436 |
| 6,424,157 B1 | * | 7/2002 | Gollomp | ................. B60L 58/12 324/426 |
| 6,957,139 B2 | | 10/2005 | Bellinger | |
| 8,036,785 B2 | | 10/2011 | Maguire et al. | |

(Continued)

FOREIGN PATENT DOCUMENTS

WO  WO-2017/023898  2/2017

*Primary Examiner* — Behrang Badii
(74) *Attorney, Agent, or Firm* — Foley & Lardner LLP

(57) ABSTRACT

A method includes receiving, by a remote server, operating parameters regarding one or more components of a vehicle from a vehicle controller of the vehicle; retrieving, by the remote server, at least one of static information or dynamic information regarding one or more parameters ahead of the vehicle; determining, by the remote server, an adjustment for at least one of the one or more components of the vehicle based on (i) the operating parameters and (ii) the at least one of the static information or the dynamic information; and providing, by the remote server, an instruction to the vehicle controller regarding the adjustment.

10 Claims, 10 Drawing Sheets

(56) References Cited

U.S. PATENT DOCUMENTS

| | | |
|---|---|---|
| 8,050,856 B2 | 11/2011 | Duty et al. |
| 8,260,481 B2 | 9/2012 | Naik et al. |
| 8,352,146 B2 | 1/2013 | Doering |
| 8,386,091 B2 | 2/2013 | Kristinsson et al. |
| 8,392,091 B2 | 3/2013 | Hebbale et al. |
| 8,452,509 B2 | 5/2013 | Sujan et al. |
| 10,215,576 B2 * | 2/2019 | Kang .................. G01C 21/3492 |
| 2010/0043404 A1 * | 2/2010 | Hebbale .................... F01N 9/00 60/274 |
| 2012/0261397 A1 * | 10/2012 | Schwarz ............. H01M 10/633 219/202 |
| 2014/0244129 A1 * | 8/2014 | Filev ...................... B60K 31/00 701/93 |
| 2015/0275787 A1 * | 10/2015 | Dufford ................ B60W 10/08 701/112 |
| 2015/0280294 A1 * | 10/2015 | Shin ........................ B60L 58/26 429/50 |
| 2015/0345621 A1 | 12/2015 | Sujan et al. |
| 2017/0001639 A1 * | 1/2017 | Dempsey ................. G08G 1/16 |

\* cited by examiner

TELEMETRY PREDICTIVE CONTROL FOR VEHICLE OPERATIONS

CROSS-REFERENCE TO RELATED PATENT APPLICATION

This application claims the benefit of and priority to U.S. Provisional Patent Application No. 62/767,938 entitled "Telemetry Predictive Control for Vehicle Operations," filed Nov. 15, 2018, which is incorporated herein by reference in its entirety.

BACKGROUND

Route look-ahead systems are used to identify static characteristics ahead of a vehicle such as road grade and speed limits to assist in adjusting operating characteristics of a vehicle to provide for various benefits, such as improving fuel efficiency. However, such route look-ahead systems traditionally do not provide information regarding dynamic characteristics ahead of the vehicle, as well as, the dynamics and operating constraints of subsystems of the vehicle are not taken into account when adjusting the operating characteristics of the vehicle and, thereby, such systems do not provide a comprehensive solution to, for example, optimize one or more vehicle operating parameters, such as vehicle fuel efficiency.

SUMMARY

One embodiment relates to a method. The method includes receiving, by a remote server, operating parameters regarding one or more components of a vehicle from a vehicle controller of the vehicle; retrieving, by the remote server, at least one of static information or dynamic information regarding one or more parameters ahead of the vehicle, the static information including road parameters, the dynamic information including at least one of weather information or traffic information; determining, by the remote server, an adjustment for at least one of the one or more components of the vehicle based on (i) the operating parameters and (ii) the at least one of the static information or the dynamic information; and providing, by the remote server, an instruction to the vehicle controller regarding the adjustment. The instruction includes at least one of (i) a first command for the vehicle controller to implement the adjustment to the at least one of the one or more components of the vehicle or (ii) a second command for the vehicle controller to display the adjustment for the at least one of the one or more components of the vehicle.

Another embodiment relates to a control system for a vehicle. The control system includes a vehicle controller installable on the vehicle and a remote server. The vehicle controller is structured to acquire an operating parameter regarding a component of the vehicle. The vehicle controller is structured to transmit the operating parameter to the remote server. The remote server is structured to acquire static information regarding a road parameter ahead of the vehicle and dynamic information regarding at least one of weather information or traffic information ahead of the vehicle. The remote server is structured to determine an adjustment for the component of the vehicle based on the operating parameter, the static information, and the dynamic information. The remote server is structured to transmit an instruction to the vehicle controller regarding the adjustment. The instruction includes at least one of (i) a first command for the vehicle controller to implement the adjustment to the component of the vehicle or (ii) a second command for the vehicle controller to display the adjustment for the component of the vehicle on a display device of the vehicle.

Still another embodiment relates to a method. The method includes acquiring, by a remote server, an operating parameter regarding a component of a vehicle; acquiring, by the remote server, static information regarding a road parameter ahead of the vehicle; acquiring, by the remote server, dynamic information regarding weather information and traffic information; determining, by the remote server, an adjustment for the component of the vehicle based on the operating parameter, the static information, and the dynamic information; and transmitting, by the remote server, an instruction to the vehicle controller regarding the adjustment. The instruction includes at least one of (i) a first command for the vehicle controller to implement the adjustment to the component of the vehicle or (ii) a second command for the vehicle controller to display the adjustment for the component of the vehicle on a display device of the vehicle.

These and other features, together with the organization and manner of operation thereof, will become apparent from the following detailed description when taken in conjunction with the accompanying drawings.

DETAILED DESCRIPTION

Following below are more detailed descriptions of various concepts related to, and implementations of, methods, apparatuses, and systems for predictive control of operating parameters of a vehicle. The various concepts introduced above and discussed in greater detail below may be implemented in any number of ways, as the concepts described are not limited to any particular manner of implementation. Examples of specific implementations and applications are provided primarily for illustrative purposes.

Referring to the Figures generally, the various embodiments disclosed herein relate to systems, apparatuses, and methods for predictive control of one or more operating parameters of a vehicle based on characteristics and/or parameters ahead of the vehicle. Such predictive control may take into account various vehicle and subsystems dynamics and constraints. Such predictive control is applicable to any powertrain type, such as an internal combustion engine driven powertrain, a hybrid powertrain, and a pure electric powertrain, among other possibilities. The predictive control facilitates integrating future route information to optimally control operation of the powertrain of the vehicle, while taking into account subsystem dynamics and constraints. Such subsystem dynamics and constraints may include aftertreatment system temperature in a conventional powertrain (e.g., engine driven) or battery and electric machine thermal dynamics in electrified architectures (e.g., hybrid, pure electric, etc.). Such subsystem dynamics may be taken into account to reduce energy loss due to thermal and cooling management.

Figure 1:
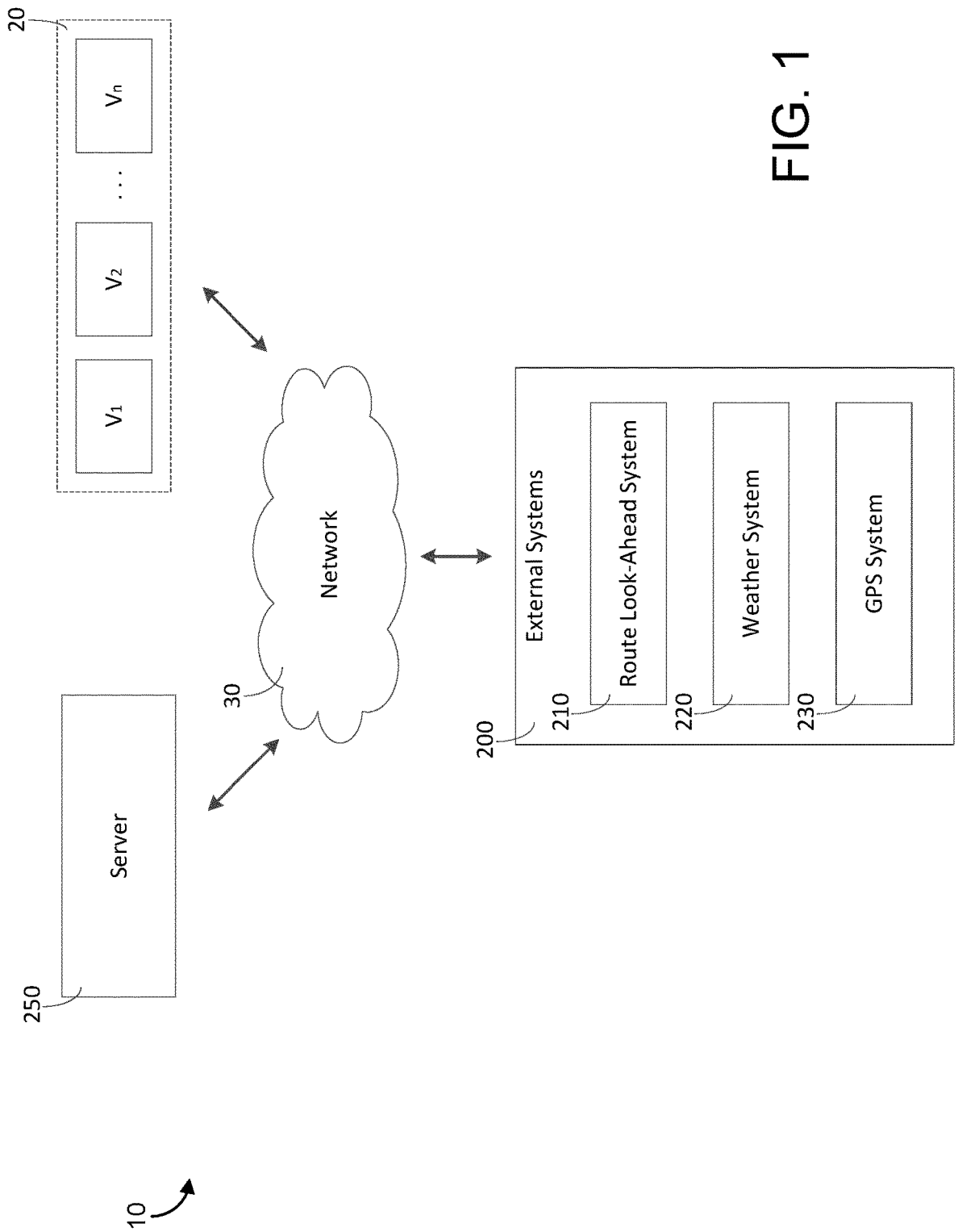
FIG. 1 is a schematic diagram of a vehicle control system, according to an example embodiment.

As shown in FIG. 1, a vehicle control system 10 includes one or more vehicles 20, a network 30, one or more external systems 200, and a server 250. According to an example embodiment, the network 30 wirelessly communicably couples the server 250 to the vehicles 20 and the external systems 200. In an alternative embodiment, one or more of the external systems 200 are integrated into the server 250. As shown in FIG. 1, the external systems 200 include a route look-ahead system 210, a weather system 220, and a GPS system 230. In some embodiments, the external systems 200 include fewer, more, or different systems. The route look-ahead system 210 may be structured to acquire route look-ahead data including static information indicative of road parameters ahead of a respective vehicle 20. The road parameters may include information regarding road function class (e.g., freeway/interstate, arterial roads, collectors, local roads, unclassified roads, etc.), speed limits, road grade, road slope, road curvature, bridges, fuel stations, number of lanes, and the like. The route look-ahead system 210 may be additionally or alternatively structured to acquire route look-ahead data including dynamic information indicative of traffic information ahead of the respective vehicle 20. The traffic information may include information regarding traffic patterns, traffic jams, traffic speeds, construction, etc. ahead of the respective vehicle 20.

The weather system 220 may be structured to acquire weather data including dynamic information indicative of weather conditions ahead of the respective vehicle 20. The weather conditions may include information indicative of road surface conditions (e.g., wet, icy, snowy, dry, etc.) and/or weather (e.g., rain, snow, temperature, humidity, etc.) ahead of the respective vehicle 20. The GPS system 230 may be structured to (i) receive information regarding a current location and a desired destination of the respective vehicle and (ii) generate GPS data that facilitates determining one or more routes from the current location and the desired destination. In some embodiments, a route of the vehicle 20 is predicted by extrapolating a current location of the vehicle 20 relative a finite distance ahead of the vehicle 20 (e.g., the system assumes the vehicle 20 will continue traveling on the road the vehicle is currently on if there are no roads to turn onto for X distance).

Figure 2:
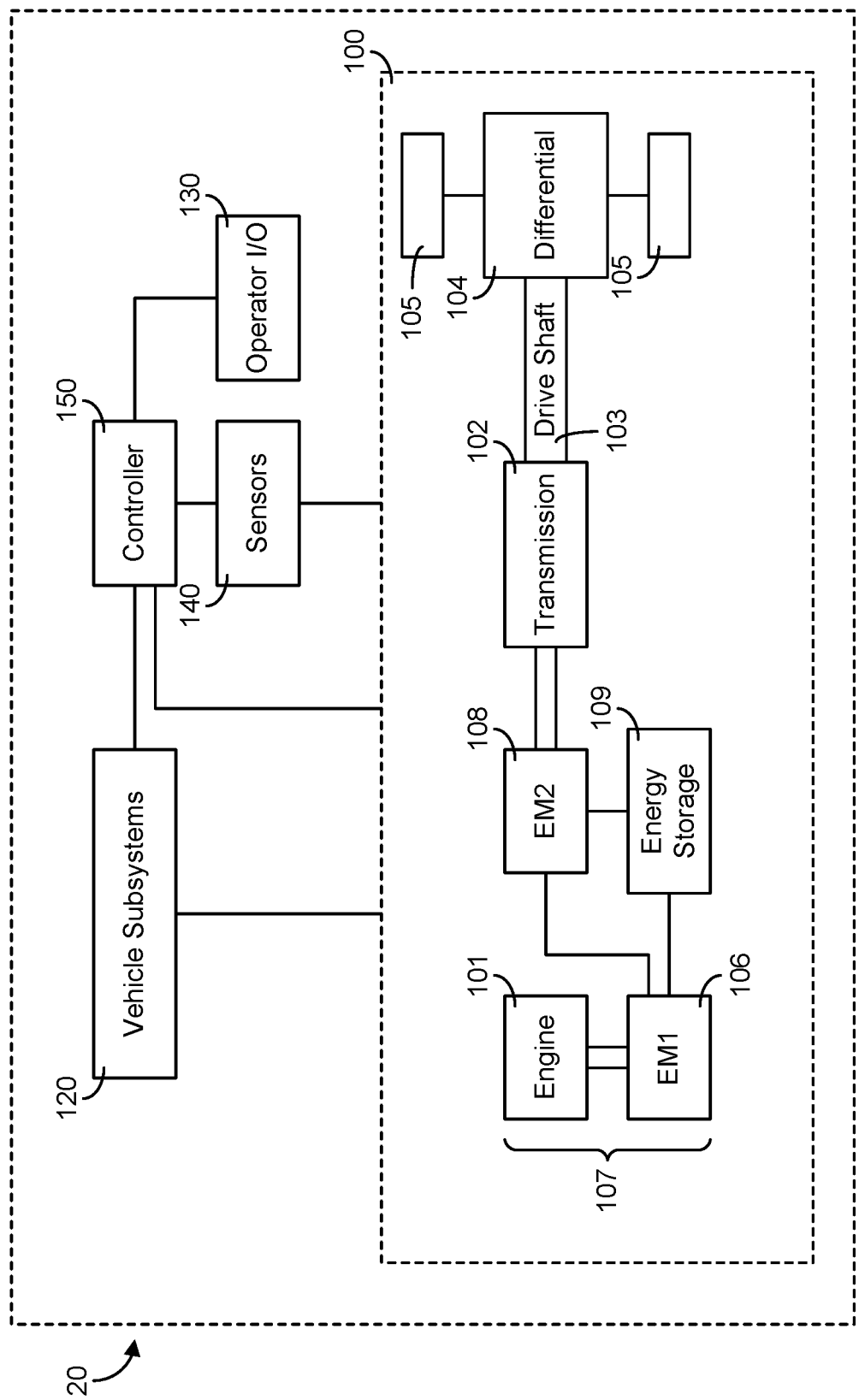
FIG. 2 is a schematic diagram of a vehicle having a series hybrid powertrain and a controller used with the vehicle control system of FIG. 1, according to an example embodiment.
Figure 3:
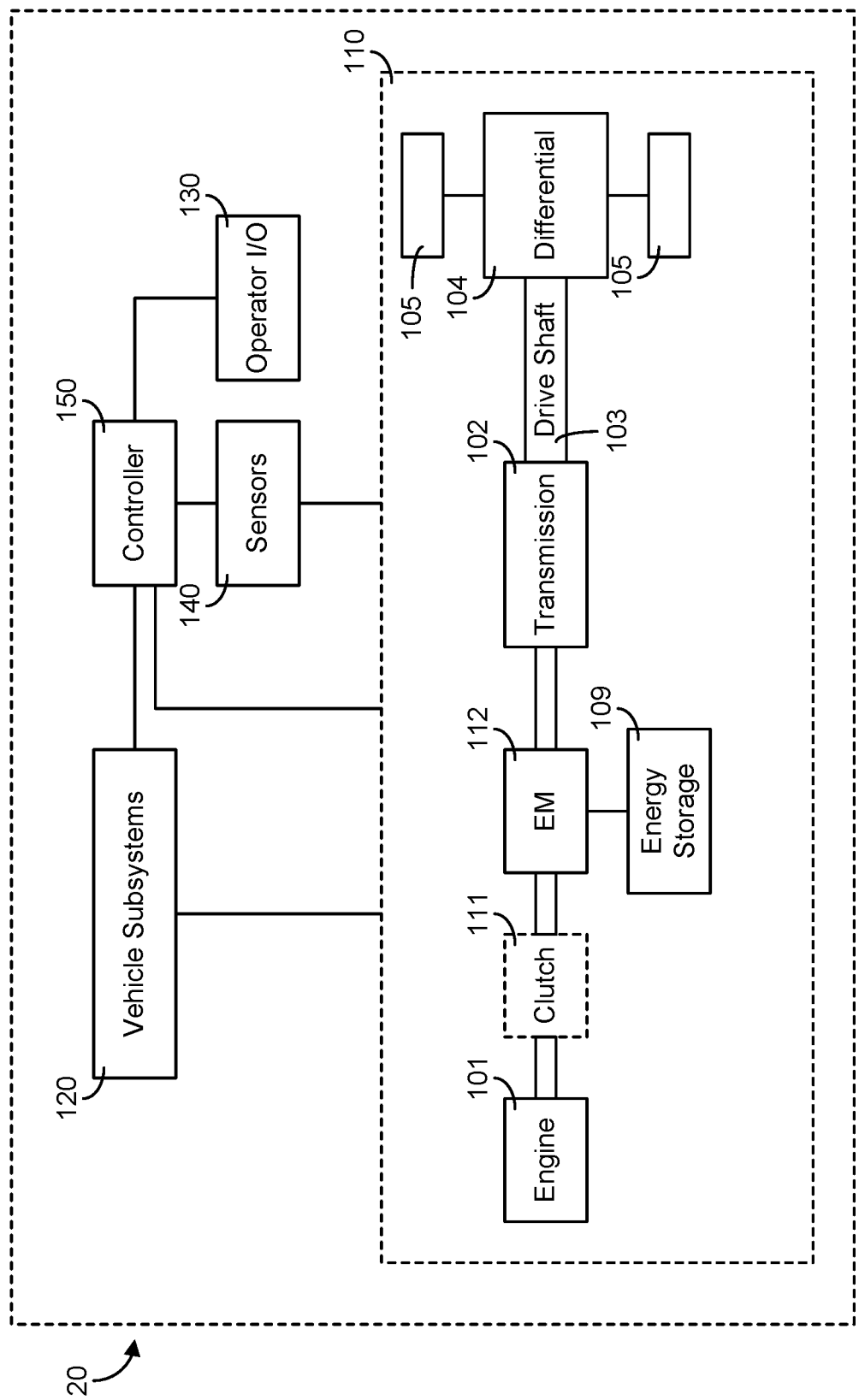
FIG. 3 is a schematic diagram of a vehicle having a parallel hybrid powertrain and a controller used with the vehicle control system of FIG. 1, according to an example embodiment.
Figure 4:
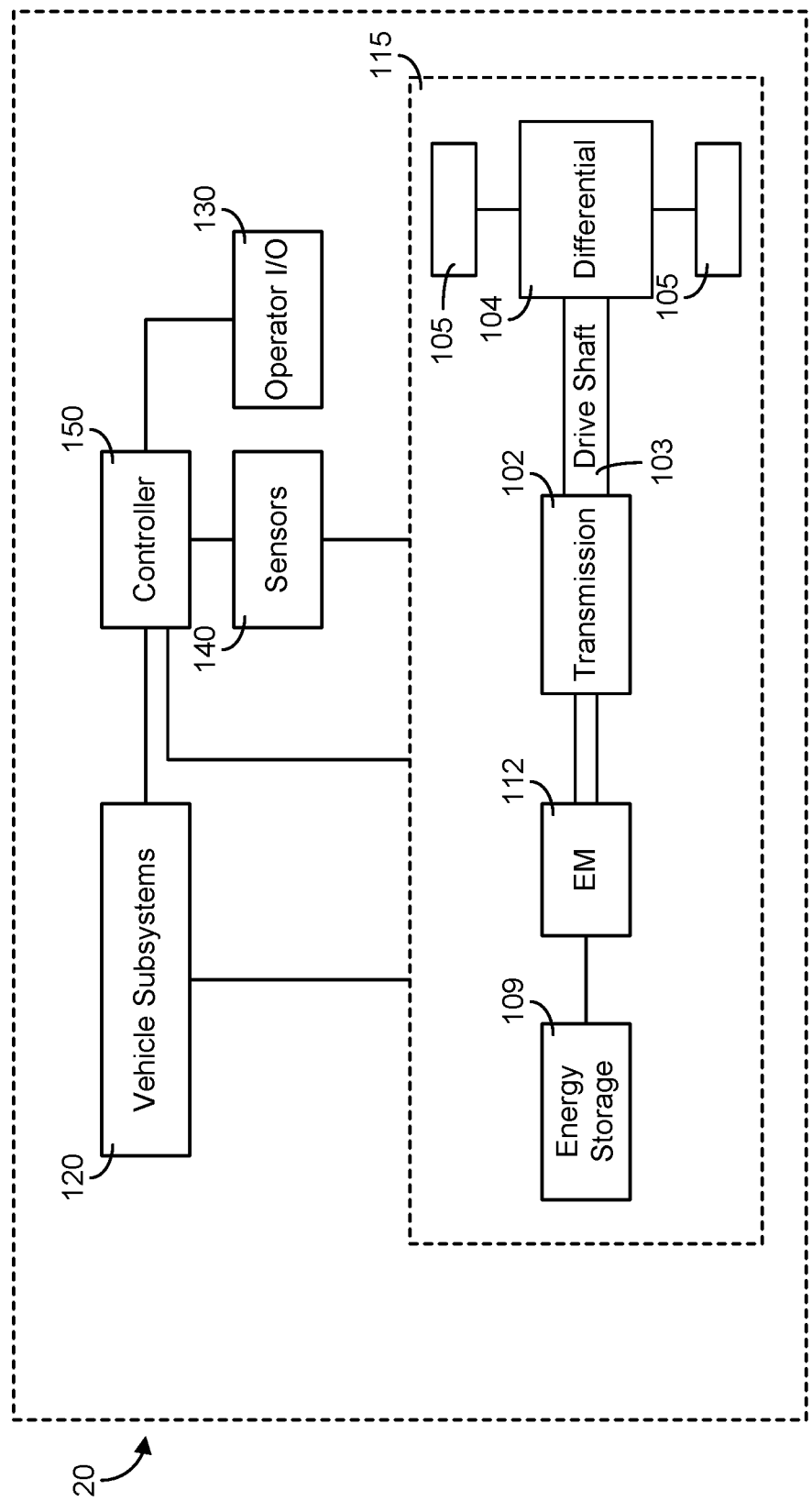
FIG. 4 is a schematic diagram of a vehicle having a full electric powertrain and a controller used with the vehicle control system of FIG. 1, according to an example embodiment.
Figure 5:
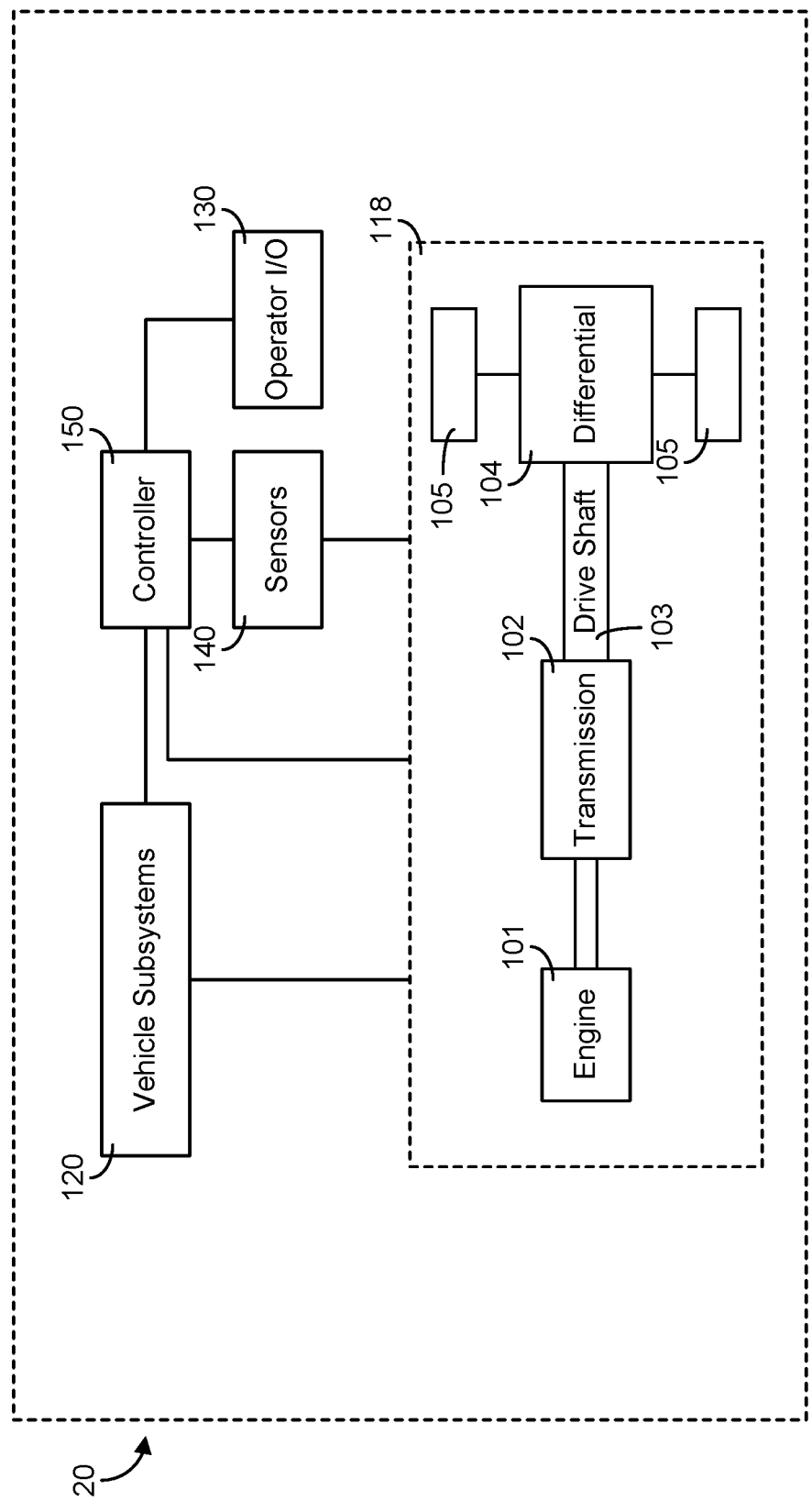
FIG. 5 is a schematic diagram of a vehicle having an internal combustion engine driven powertrain and a controller used with the vehicle control system of FIG. 1, according to an example embodiment.

Referring now to FIGS. 2-5, schematic diagrams of the vehicle 20 are shown according to various example embodiments. As shown in FIG. 2, the vehicle 20 includes a powertrain 100, vehicle subsystems 120, an operator input/output (I/O) device 130, sensors 140 communicably coupled to one or more components of the vehicle 20, and a vehicle controller 150. As shown in FIG. 3, the vehicle 20 includes a powertrain 110 in place of the powertrain 100 of FIG. 2. As shown in FIG. 4, the vehicle 20 includes a powertrain 115 in place of the powertrain 100 of FIG. 2 and the powertrain 110 of FIG. 3. As shown in FIG. 5, the vehicle 20 includes a powertrain 118 in place of the powertrain 100 of FIG. 2, the powertrain 110 of FIG. 3, and the powertrain 115 of FIG. 4. These components are described more fully herein.

According to the example embodiment shown in FIG. 2, the powertrain 100 of the vehicle 20 is structured as a series hybrid powertrain. According to the example embodiment shown in FIG. 3, the powertrain 110 of the vehicle 20 is structured as a parallel hybrid powertrain. In some embodiments, the powertrain 100 and/or the powertrain 110 of the vehicle 20 are structured as another type of hybrid powertrain. According to the example embodiment shown in FIG. 4, the powertrain 115 of the vehicle 20 is structured as a full electric powertrain. According to the example embodiment shown in FIG. 5, the powertrain 118 is structured as a conventional, non-hybrid, non-electric powertrain (i.e., an internal combustion engine driven powertrain). The vehicle 20 may be an on-road or an off-road vehicle including, but not limited to, line-haul trucks, mid-range trucks (e.g., pick-up truck), cars (e.g., sedans, hatchbacks, coupes, etc.), buses, vans, refuse vehicles, fire trucks, concrete trucks, delivery trucks, and any other type of vehicle. Thus, the present disclosure is applicable with a wide variety of implementations.

Components of the vehicle 20 may communicate with each other or foreign components using any type and any number of wired or wireless connections. For example, a wired connection may include a serial cable, a fiber optic cable, a CAT5 cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections. Because the vehicle controller 150 is communicably coupled to the systems and components in the vehicle 20, the vehicle controller 150 is structured to receive data regarding one or more of the components shown in FIGS. 2-5. For example, the data may include operation data regarding the operating conditions of the powertrain 100, the powertrain 110, the powertrain 115, the powertrain 118, and/or other components (e.g., a battery system, a motor, a generator, a regenerative braking system, an engine, an exhaust aftertreatment system, etc.) acquired by one or more sensors, such as sensors 140. As another example, the data may include an input received by the operator I/O device 130. The vehicle controller 150 may determine how to control the powertrain 100, the powertrain 110, the powertrain 115, and/or the powertrain 118 at least in part based on the data.

As shown in FIG. 2, the powertrain 100 (e.g., a series hybrid powertrain, etc.) includes an engine 101, a transmission 102, a driveshaft 103, a differential 104, a final drive 105, a first electromagnetic device 106 (e.g., a generator, a motor-generator, etc.), a second electromagnetic device 108

(e.g., a motor, a motor-generator, etc.), and an energy storage device 109. The engine 101 may be structured as any engine type, including a spark-ignition internal combustion engine, a compression-ignition internal combustion engine, and/or a fuel cell, among other alternatives. The engine 101 may be powered by any fuel type (e.g., diesel, ethanol, gasoline, natural gas, propane, hydrogen, etc.). Similarly, the transmission 102 may be structured as any type of transmission, such as a continuous variable transmission, a manual transmission, an automatic transmission, an automatic-manual transmission, a dual clutch transmission, and so on.

Accordingly, as transmissions vary from geared to continuous configurations (e.g., continuous variable transmission), the transmission 102 may include a variety of settings (gears, for a geared transmission) that affect different output speeds based on an input speed received thereby (e.g., from the second electromagnetic device 108, etc.). Like the engine 101 and the transmission 102, the driveshaft 103, the differential 104, and/or the final drive 105 may be structured in any configuration dependent on the application (e.g., the final drive 105 is structured as wheels in an automotive application and a propeller in a boat application, etc.). Further, the driveshaft 103 may be structured as any type of driveshaft including, but not limited to, a one-piece, two-piece, and a slip-in-tube driveshaft based on the application.

As shown in FIG. 2, the engine 101 and the first electromagnetic device 106 are mechanically coupled together (e.g., via a shaft, a gear box, etc.) to form a genset 107. In some embodiments, the first electromagnetic device 106 is a single device having both generating and motoring capabilities. In some embodiments, the first electromagnetic device 106 has only generating capabilities. According to an example embodiment, the engine 101 is structured to drive the first electromagnetic device 106 to generate electrical energy. As shown in FIG. 2, the first electromagnetic device 106 is electrically coupled to the energy storage device 109 such that the first electromagnetic device 106 may provide energy generated thereby to the energy storage device 109 for storage. In some embodiments, the first electromagnetic device 106 is structured to receive stored electrical energy from the energy storage device 109 to facilitate operation thereof. By way of example, the first electromagnetic device 106 may receive stored electrical energy from the energy storage device 109 to facilitate starting the engine 101.

As shown in FIG. 2, the second electromagnetic device 108 is mechanically coupled to the transmission 102 (e.g., via a shaft, a gear box, etc.). In an alternative embodiment, the powertrain 100 does not include the transmission 102 and the second electromagnetic device 108 is directly coupled to the driveshaft 103 or the differential 104. In some embodiments, the second electromagnetic device 108 is a single device having both generating and motoring capabilities. In some embodiments, the second electromagnetic device 108 has only motoring capabilities. As shown in FIG. 2, the second electromagnetic device 108 is electrically coupled to the first electromagnetic device 106 and the energy storage device 109 such that the second electromagnetic device 108 may receive energy stored by the energy storage device 109 and/or generated by the first electromagnetic device 106 to facilitate operation thereof. By way of example, the second electromagnetic device 108 may receive stored electrical energy from the energy storage device 109 and/or generated electrical energy from the first electromagnetic device 106 to facilitate providing a mechanical output to the transmission 102. In some embodiments, the second electromagnetic device 108 is structured to generate electrical energy for storage in the energy storage device 109. By way of example, the second electromagnetic device 108 may be structured to utilize a negative torque supply to perform energy regeneration (e.g., when the torque demand therefrom is zero, during engine braking, while the vehicle 20 is coasting down a hill, etc.).

According to an example embodiment, the energy storage device 109 includes one or more batteries (e.g., high voltage batteries, a lead-acid batteries, a lithium-ion batteries, lithium iron phosphate batteries, etc.), one or more capacitors (e.g., super capacitors, etc.), and/or any other energy storage devices, or combination thereof. As shown in FIG. 2, the energy storage device 109 is electrically coupled to the first electromagnetic device 106 and the second electromagnetic device 108. In some embodiments, the energy storage device 109, the first electromagnetic device 106, and/or the second electromagnetic device 108 are electrically coupled to one or more of the vehicle subsystems 120 (e.g., a regenerative braking system, electrically-powered vehicle accessories, etc.). According to an example embodiment, the energy storage device 109 is structured to store electrical energy (i) received from a charging station (e.g., a vehicle charging station, etc.), (ii) generated by the first electromagnetic device 106, (iii) generated by the second electromagnetic device 108, and/or (iv) generated by a regenerative braking system. The energy storage device 109 may be structured to provide the stored electrical energy to (i) the vehicle subsystems 120 to operate various electrical based components of the vehicle 20 (e.g., while the engine 101 is running, while the engine 101 is off, etc.), (ii) the first electromagnetic device 106 to start the engine 101 (e.g., in response to a restart command after a stop-start feature turns off the engine 101, when an operator keys on the engine 101, etc.), and/or (iii) the second electromagnetic device 108 to facilitate providing a mechanical output to the transmission 102 (e.g., to drive the vehicle 20, etc.).

As shown in FIG. 3, the powertrain 110 (e.g., a parallel hybrid powertrain, etc.) includes the engine 101, the transmission 102, the driveshaft 103, the differential 104, the final drive 105, the energy storage device 109, and an electromagnetic device 112 (e.g., a motor-generator, etc.). The powertrain 110 optionally includes a clutch 111 positioned between the engine 101 and the electromagnetic device 112. The clutch 111 is structured to facilitate selectively decoupling the engine 101 from the electromagnetic device 112. In some embodiments, the powertrain 100 of FIG. 2 includes a clutch positioned to selectively mechanically couple the first electromagnetic device 106 with the second electromagnetic device 108 and/or the transmission 102. In such an embodiment, the powertrain 100 having a clutch may be selectively reconfigurable between a series hybrid powertrain and a parallel hybrid powertrain.

As shown in FIG. 3, the engine 101 and the electromagnetic device 112 are mechanically coupled together (e.g., via a shaft, a gear box, the clutch 111, etc.). In some embodiments, the electromagnetic device 112 is a single device having both generating and motoring capabilities. According to an example embodiment, the engine 101 is structured to drive the electromagnetic device 112 to generate electrical energy. As shown in FIG. 2, the electromagnetic device 112 is electrically coupled to the energy storage device 109 such that the electromagnetic device 112 may provide energy generated thereby to the energy storage device 109 for storage. In some embodiments, the electromagnetic device 112 is structured to receive stored electrical energy from the energy storage device 109 to facilitate operation thereof. By way of example, the electromagnetic device 112 may receive stored electrical energy from the energy storage device 109 to facilitate starting the engine 101.

As shown in FIG. 3, the electromagnetic device 112 is mechanically coupled to the transmission 102 (e.g., via a shaft, a gear box, etc.). In an alternative embodiment, the powertrain 110 does not include the transmission 102 and the electromagnetic device 112 is directly coupled to the driveshaft 103 or the differential 104. The electromagnetic device 112 may receive energy stored by the energy storage device 109 and/or mechanical energy from the engine 101 to facilitate providing a mechanical output to the transmission 102. In some embodiments, the electromagnetic device 112 is structured to generate electrical energy for storage in the energy storage device 109 in response to receiving a mechanical input from the transmission 102. By way of example, the electromagnetic device 112 may be structured to utilize a negative torque supply to perform energy regeneration (e.g., when the torque demand therefrom is zero, during engine braking, while the vehicle 20 is coasting down a hill, etc.).

As shown in FIG. 3, the energy storage device 109 is electrically coupled to the electromagnetic device 112. In some embodiments, the energy storage device 109 and/or the electromagnetic device 112 are electrically coupled to one or more of the vehicle subsystems 120 (e.g., a regenerative braking system, electrically-powered vehicle accessories, etc.). According to an example embodiment, the energy storage device 109 is structured to store electrical energy (i) received from a charging station (e.g., a vehicle charging station, etc.), (ii) generated by the electromagnetic device 112, and/or (iii) generated by a regenerative braking system. The energy storage device 109 may be structured to provide the stored electrical energy to (i) the vehicle subsystems 120 to operate various electrical based components of the vehicle 20 (e.g., while the engine 101 is running, while the engine 101 is off, etc.), (ii) the electromagnetic device 112 to start the engine 101 (e.g., in response to a restart command after a stop-start feature turns off the engine 101, when an operator keys on the engine 101, etc.), and/or (iii) the electromagnetic device 112 to facilitate providing a mechanical output to the transmission 102 (e.g., to drive the vehicle 20, etc.).

As shown in FIG. 4, the powertrain 115 (e.g., a full electric powertrain, etc.) includes the transmission 102, the driveshaft 103, the differential 104, the final drive 105, the energy storage device 109, and the electromagnetic device 112. In some embodiments, the powertrain 115 does not include the transmission 102. As shown in FIG. 5, the powertrain 118 (e.g., an internal combustion engine driven powertrain, etc.) includes the engine 101, the transmission 102, the driveshaft 103, the differential 104, the final drive 105.

In the powertrain 118, the engine 101 receives a chemical energy input (e.g., a fuel such as gasoline, diesel, etc.) and combusts the fuel to generate mechanical energy, in the form of a rotating crankshaft. The transmission 102 receives the rotating crankshaft and manipulates the speed of the crankshaft (e.g., the engine revolutions-per-minute (RPM), etc.) to affect a desired driveshaft speed. The rotating driveshaft 103 is received by the differential 104, which provides the rotation energy of the driveshaft 103 to the final drive 105. The final drive 105 then propels or moves the vehicle 20.

Referring again to FIGS. 2-5, the vehicle 20 includes the vehicle subsystems 120. In some embodiments, the vehicle subsystems 120 may include a regenerative braking system. The regenerative braking system may include various components structured to generate electricity from vehicle braking events to be stored by the energy storage device 109 for future use (e.g., by the first electromagnetic device 106, by the second electromagnetic device 108, by the electromagnetic device 112, by the electrical vehicle components, etc.). The vehicle subsystems 120 may include other components including mechanically driven or electrically driven vehicle components (e.g., HVAC system, lights, pumps, fans, etc.). The vehicle subsystems 120 may also include an exhaust aftertreatment system having components used to reduce exhaust emissions, such as selective catalytic reduction (SCR) catalyst, a diesel oxidation catalyst (DOC), a diesel particulate filter (DPF), a diesel exhaust fluid (DEF) doser with a supply of diesel exhaust fluid, a plurality of sensors for monitoring the aftertreatment system (e.g., a nitrogen oxide (NOx) sensor, temperature sensors, etc.), and/or still other components.

The vehicle subsystems 120 may include one or more electrically-powered accessories and/or engine-drive accessories. Electrically-powered accessories may receive power from the energy storage device 109, the first electromagnetic device 106, the second electromagnetic device 108, and/or the electromagnetic device 112 to facilitate operation thereof. Being electrically-powered, the electrically-powered accessories may be able to be driven largely independent of the engine 101 of the vehicle 20 (e.g., not driven off of a belt coupled to the engine 101). The electrically-powered accessories may include, but are not limited to, air compressors (e.g., for pneumatic devices, etc.), air conditioning systems, power steering pumps, engine coolant pumps, fans, and/or any other electrically-powered vehicle accessories.

The operator I/O device 130 may enable an operator of the vehicle 20 (or passenger) to communicate with the vehicle 20 and the vehicle controller 150. By way of example, the operator I/O device 130 may include, but is not limited to, an interactive display, a touchscreen device, one or more buttons and switches, voice command receivers, and the like. In one embodiment, the operator I/O device 130 includes a brake pedal or a brake lever, an accelerator pedal, and/or an accelerator throttle.

The sensors 140 may include sensors positioned and/or structured to monitor operating characteristics or parameters of various components of the vehicle 20. By way of example, the sensors 140 may include a sensor structured to facilitate monitoring the state of charge ("SOC"), the state of health ("SOH"), temperature, and/or the power capacity of the energy storage device 109, and/or characteristics of the flow of electricity into and/or out of the energy storage device 109 (e.g., current, voltage, power, etc.). The sensors 140 may additionally or alternatively include a position sensor structured to facilitate monitoring the position of the accelerator (e.g., accelerator pedal, accelerator throttle, etc.) and/or the brake (e.g., brake pedal, brake lever, etc.) of the vehicle 20. The sensors 140 may additionally or alternatively include a speed sensor structured to facilitate monitoring the speed of the vehicle 20 and/or the primary driver (e.g., the engine 101, the first electromagnetic device 106, the second electromagnetic device 108, the electromagnetic device 112, etc.). The sensors 140 may additionally or alternatively include aftertreatment sensors (e.g., NOx sensors, temperature sensors, etc.) structured to facilitate monitoring the temperature of components of the exhaust aftertreatment system, the temperature of the exhaust gases, and/or the composition of the exhaust gasses. The sensors 140 may additionally or alternatively includes sensors structured to facilitate monitoring a torque and/or power output of the primary driver (e.g., the engine 101, the first electromagnetic device 106, the second electromagnetic device 108, the electromagnetic device 112, etc.). The sensors 140 may additionally or alternatively includes sensors structured to facilitate monitoring a current transmission gear selection of the transmission 102.

As the components of FIGS. 2-5 are shown to be embodied in the vehicle 20, the vehicle controller 150 may be structured as one or more electronic control units (ECUs). As such, the vehicle controller 150 may be separate from or included with at least one of a transmission control unit, an exhaust aftertreatment control unit, a powertrain control module, an engine control module, etc. The function and structure of the vehicle controller 150 is described in greater detail with regards to FIG. 6.

Figure 6:
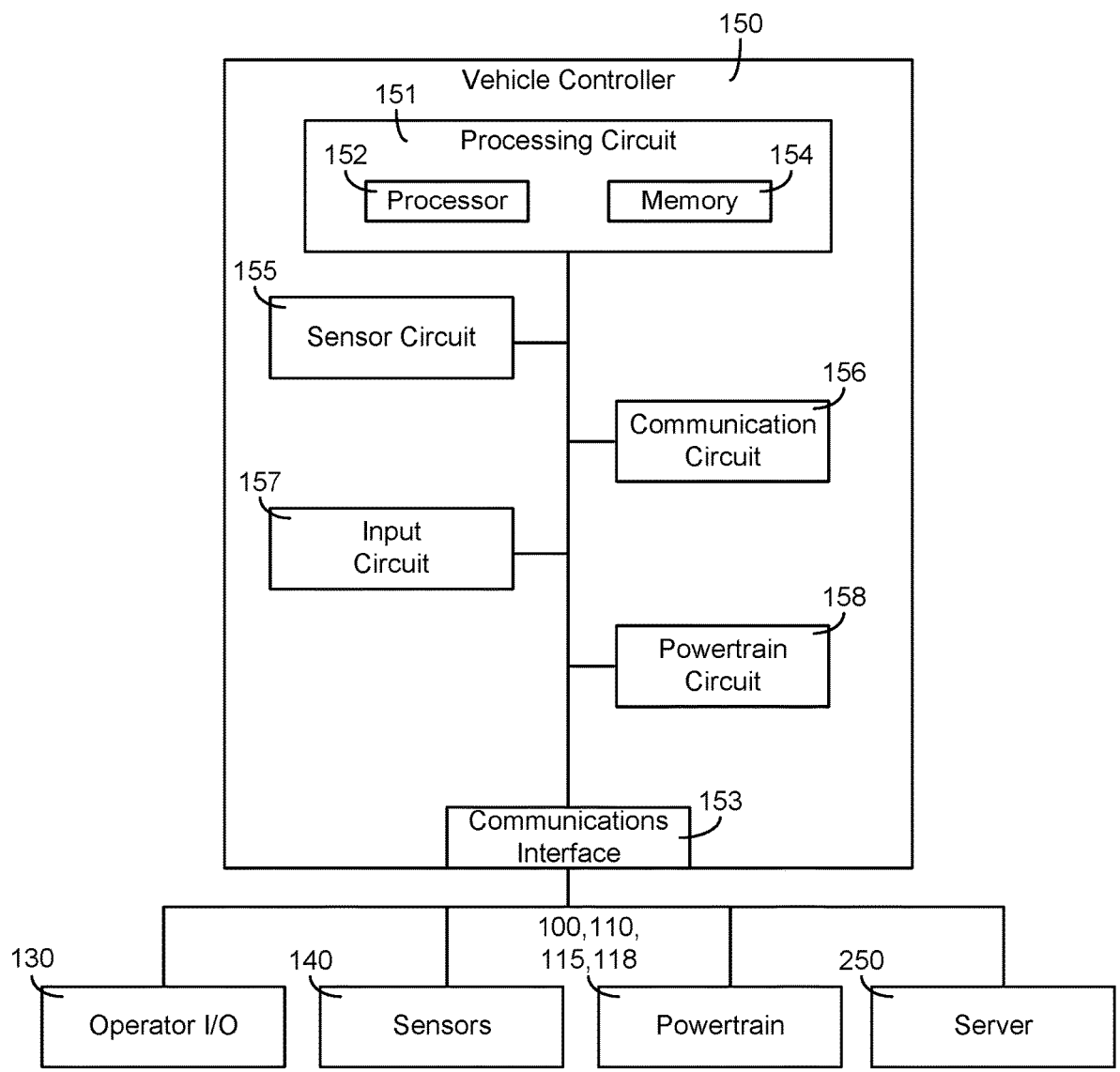
FIG. 6 is a schematic diagram of a controller included with the vehicles of FIGS. 2-5, according to an example embodiment.

Referring now to FIG. 6, a schematic diagram of the vehicle controller 150 of the vehicle 20 of FIGS. 1-5 and 7 is shown according to an example embodiment. As shown in FIG. 6, the vehicle controller 150 includes a processing circuit 151 having a processor 152 and a memory 154; a communications interface 153; a sensor circuit 155; a communication circuit 156; an input circuit 157; and a powertrain circuit 158. As described herein, the vehicle controller 150 is structured to facilitate (i) collecting and transmitting data to the server 250 regarding operation of the vehicle 20 and (ii) receive adjustment commands from the server 250 to adjust the operation of the vehicle 20 (e.g., speed, torque, gear selection, etc.) to provide for enhanced driving (e.g., increased fuel efficiency, etc.). As described in more detail herein, the server 250 performs all of the operating adjustment analysis such that the bulk of the computation for controlling the vehicle 20 is performed remotely (e.g., off board computation to reduce local computation demands, etc.). However, in alternative embodiments, the vehicle controller 150 performs some or all of the tasks of the server 250 locally such that the server 250 the functions of the server 250 described herein are limited/reduced or the server 250 may not be included in the vehicle control system 10.

In one configuration, the sensor circuit 155, the communication circuit 156, the input circuit 157, and the powertrain circuit 158 are embodied as machine or computer-readable media that is executable by a processor, such as the processor 152. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). Thus, the computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the sensor circuit 155, the communication circuit 156, the input circuit 157, and the powertrain circuit 158 are embodied as hardware units, such as electronic control units. As such, the sensor circuit 155, the communication circuit 156, the input circuit 157, and/or the powertrain circuit 158 may be embodied as one or more circuitry components including, but not limited to, processing circuitry, network interfaces, peripheral devices, input devices, output devices, sensors, etc. In some embodiments, the sensor circuit 155, the communication circuit 156, the input circuit 157, and/or the powertrain circuit 158 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the sensor circuit 155, the communication circuit 156, the input circuit 157, and/or the powertrain circuit 158 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on. Thus, the sensor circuit 155, the communication circuit 156, the input circuit 157, and/or the powertrain circuit 158 may also include programmable hardware devices such as field programmable gate arrays, programmable array logic, programmable logic devices or the like. In this regard, the sensor circuit 155, the communication circuit 156, the input circuit 157, and/or the powertrain circuit 158 may include one or more memory devices for storing instructions that are executable by the processor(s) of the sensor circuit 155, the communication circuit 156, the input circuit 157, and/or the powertrain circuit 158. The one or more memory devices and processor(s) may have the same definition as provided below with respect to the memory 154 and the processor 152. Thus, in this hardware unit configuration, the sensor circuit 155, the communication circuit 156, the input circuit 157, and/or the powertrain circuit 158 may be geographically dispersed throughout separate locations in the vehicle 20 (e.g., separate control units, etc.). Alternatively and as shown, the sensor circuit 155, the communication circuit 156, the input circuit 157, and/or the powertrain circuit 158 may be embodied in or within a single unit/housing, which is shown as the vehicle controller 150.

In the example shown, the vehicle controller 150 includes the processing circuit 151 having the processor 152 and the memory 154. The processing circuit 151 may be structured or configured to execute or implement the instructions, commands, and/or control processes described herein with respect to the sensor circuit 155, the communication circuit 156, the input circuit 157, and/or the powertrain circuit 158. Thus, the depicted configuration represents the aforementioned arrangement where the sensor circuit 155, the communication circuit 156, the input circuit 157, and/or the powertrain circuit 158 are embodied as machine or computer-readable media. However, as mentioned above, this illustration is not meant to be limiting as the present disclosure contemplates other embodiments such as the aforementioned embodiment where the sensor circuit 155, the communication circuit 156, the input circuit 157, and/or the powertrain circuit 158, or at least one circuit of the sensor circuit 155, the communication circuit 156, the input circuit 157, and/or the powertrain circuit 158, are configured as a hardware unit. All such combinations and variations are intended to fall within the scope of the present disclosure.

The processor 152 may be implemented as one or more general-purpose processors, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the sensor circuit 155, the communication circuit 156, the input circuit 157, and/or the powertrain circuit 158 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory 154 (e.g., RAM, ROM, Flash Memory, hard disk storage, etc.) may store data and/or computer code for facilitating the various processes described herein. The memory 154 may be communicably connected to the processor 152 to provide computer code or instructions to the processor 152 for executing at least some of the processes described herein. Moreover, the memory 154 may be or include tangible, non-transient volatile memory or non-volatile memory. Accordingly, the memory 154 may include database components, object code components, script components, or any other type of information structure for supporting the various activities and information structures described herein.

The communications interface 153 may include any number and type of wired or wireless interfaces (e.g., jacks, antennas, transmitters, receivers, transceivers, wire terminals, etc.) for conducting data communications with various systems, devices, or networks. For example, the communications interface 153 may include an Ethernet card and port for sending and receiving data via an Ethernet-based communications network and/or a Wi-Fi transceiver for communicating via a wireless communications network. The communications interface 153 may be structured to communicate via local area networks or wide area networks (e.g., the Internet, etc.) and may use a variety of communications protocols (e.g., IP, LON, Bluetooth, ZigBee, radio, cellular, near field communication, etc.).

The communications interface 153 of the vehicle controller 150 may facilitate communication between and among the vehicle controller 150, one or more components of the vehicle 20 (e.g., components of the powertrain 100, components of the powertrain 110, components of the powertrain 115, components of the powertrain 118, the vehicle subsystems 120, the operator I/O device 130, the sensors 140, etc.), and/or the server 250. In some embodiments, the communications interface 153 additionally or alternatively facilitates communication with one or more of the external systems 200. Communication between and among the vehicle controller 150, the components of the vehicle 20, the external systems 200, and/or the server 250 may be via any number of wired or wireless connections (e.g., any standard under IEEE 802, etc.). For example, a wired connection may include a serial cable, a fiber optic cable, a CAT5 cable, or any other form of wired connection. In comparison, a wireless connection may include the Internet, Wi-Fi, cellular, Bluetooth, ZigBee, radio, etc. In one embodiment, a controller area network (CAN) bus provides the exchange of signals, information, and/or data. The CAN bus can include any number of wired and wireless connections that provide the exchange of signals, information, and/or data. The CAN bus may include a local area network (LAN), or a wide area network (WAN), or the connection may be made to an external computer (for example, through the Internet using an Internet Service Provider).

The sensor circuit 155 is structured to receive or acquire operating data from the sensors 140 regarding operating characteristics or parameters of one or more components of the vehicle 20. By way of example, the operating parameters may include an engine speed, an engine torque, a vehicle speed, a transmission gear selection, an exhaust aftertreatment system temperature, and/or a battery system temperature, among other possible parameters.

The communication circuit 156 is structured to facilitate controlling communication between the vehicle controller 150 and the server 250 (and/or the external systems 200) via the communications interface 153. By way of example, the communication circuit 156 may be structured to provide the operating data to the server 250. By way of another example, the communication circuit 156 may be structured to receive a first command from the server 250 regarding an adjustment to one or more components of the vehicle 20 for the vehicle controller 150 to implement. The adjustment made in response to the first command may be able to be manually overridden by the user (e.g., via the operator I/O device 130, etc.). By way of another example, the communication circuit 156 may be structured to receive a second command from the server 250 to display an adjustment for one or more components of the vehicle 20 for the user to (i) manually implement or (ii) provide approval for before the vehicle controller 150 implements the adjustment. In some embodiments, the communication circuit 156 is structured to facilitate communication with the route look-ahead system 210, the weather system 220, and/or the GPS system 230 (e.g., in embodiments where the vehicle controller 150 performs one or more functions of the server 250 locally, etc.).

The input circuit 157 is structured to receive an input from an operator of the vehicle 20 via the operator I/O device 130. By way of example, the input may include a current location and/or a desired destination for the vehicle 20 (e.g., for use by the server 250, the route look-ahead system 210, the weather system 220, the GPS system 230, etc.). By way of another example, the input may include a selection of a route of travel for the vehicle 20 based on one or more possible routes. By way of yet another example, the input may include an approval of an adjustment recommended by the server 250 (e.g., as part of the second command, etc.).

The powertrain circuit 158 is structured to control the one or more components (e.g., the engine 101, the transmission 102, the first electromagnetic device 106, the second electromagnetic device 108, the electromagnetic device 112, etc.) of a powertrain (e.g., the powertrain 100, the powertrain 110, the powertrain 115, the powertrain 118, etc.) of the vehicle 20 according to the first command and/or the second command provided by the server 250 to implement the adjustment to the one or more components of the vehicle 20 recommended by the server 250. Such adjustment, as described in more detail herein, improves the operation of the vehicle 20 in some manner (e.g., improving fuel efficiency relative to a baseline target or value for fuel efficiency, etc.) based on static information and/or dynamic information regarding one or more parameters ahead of the vehicle 20.

Figure 7:
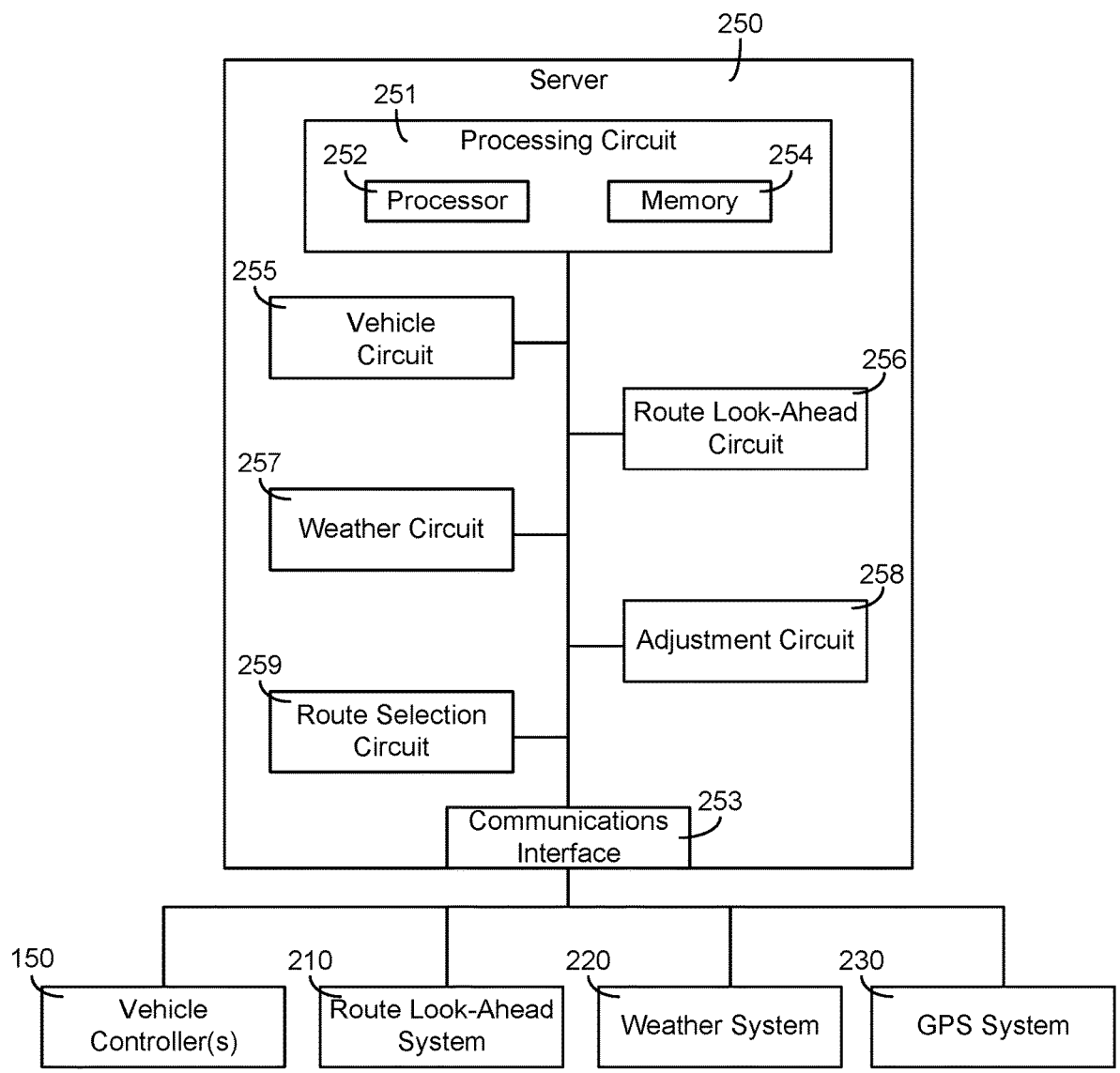
FIG. 7 is a schematic diagram of a server of the vehicle control system of FIG. 1, according to an example embodiment.

Referring now to FIG. 7, a schematic diagram of the server 250 of FIGS. 1 and 6 is shown according to an example embodiment. As shown in FIG. 7, the server 250 includes a processing circuit 251 having a processor 252 and a memory 254; a communications interface 253; a vehicle circuit 255; a route look-ahead circuit 256, a weather circuit 257; an adjustment circuit 258, and a route selection circuit 259. As described in more detail herein, the server 250 is structured to determine adjustments for one or more components of the vehicle 20 based on (i) operating parameters of one or more components of the vehicle 20 and (ii) static information and/or dynamic information regarding parameters ahead of the vehicle 20.

In one configuration, the vehicle circuit 255, the route look-ahead circuit 256, the weather circuit 257, the adjustment circuit 258, and the route selection circuit 259 are embodied as machine or computer-readable media that is executable by a processor, such as the processor 252. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). Thus, the computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the vehicle circuit 255, the route look-ahead circuit 256, the weather circuit 257, the adjustment circuit 258, and the route selection circuit 259 are embodied as hardware units, such as electronic control units. As such, the vehicle circuit 255, the route look-ahead circuit 256, the weather circuit 257, the adjustment circuit 258, and/or the route selection circuit 259 may be embodied as one or more circuitry components including, but not limited to, processing circuitry, network interfaces, peripheral devices, input devices, output devices, sensors, etc. In some embodiments, the vehicle circuit 255, the route look-ahead circuit 256, the weather circuit 257, the adjustment circuit 258, and/or the route selection circuit 259 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the vehicle circuit 255, the route look-ahead circuit 256, the weather circuit 257, the adjustment circuit 258, and/or the route selection circuit 259 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on. Thus, the vehicle circuit 255, the route look-ahead circuit 256, the weather circuit 257, the adjustment circuit 258, and/or the route selection circuit 259 may also include programmable hardware devices such as field programmable gate arrays, programmable array logic, programmable logic devices or the like. In this regard, the vehicle circuit 255, the route look-ahead circuit 256, the weather circuit 257, the adjustment circuit 258, and/or the route selection circuit 259 may include one or more memory devices for storing instructions that are executable by the processor(s) of the vehicle circuit 255, the route look-ahead circuit 256, the weather circuit 257, the adjustment circuit 258, and/or the route selection circuit 259. The one or more memory devices and processor(s) may have the same definition as provided below with respect to the memory 254 and the processor 252. Thus, in this hardware unit configuration, the vehicle circuit 255, the route look-ahead circuit 256, the weather circuit 257, the adjustment circuit 258, and/or the route selection circuit 259 may be geographically dispersed throughout separate locations in the server 250 (e.g., separate control units, etc.). Alternatively and as shown, the vehicle circuit 255, the route look-ahead circuit 256, the weather circuit 257, the adjustment circuit 258, and/or the route selection circuit 259 may be embodied in or within a single unit/housing, which is shown as the server 250.

In the example shown, the server 250 includes the processing circuit 251 having the processor 252 and the memory 254. The processing circuit 251 may be structured or configured to execute or implement the instructions, commands, and/or control processes described herein with respect to the vehicle circuit 255, the route look-ahead circuit 256, the weather circuit 257, the adjustment circuit 258, and/or the route selection circuit 259. Thus, the depicted configuration represents the aforementioned arrangement where the vehicle circuit 255, the route look-ahead circuit 256, the weather circuit 257, the adjustment circuit 258, and/or the route selection circuit 259 are embodied as machine or computer-readable media. However, as mentioned above, this illustration is not meant to be limiting as the present disclosure contemplates other embodiments such as the aforementioned embodiment where the vehicle circuit 255, the route look-ahead circuit 256, the weather circuit 257, the adjustment circuit 258, and/or the route selection circuit 259, or at least one circuit of the vehicle circuit 255, the route look-ahead circuit 256, the weather circuit 257, the adjustment circuit 258, and/or the route selection circuit 259, are configured as a hardware unit. All such combinations and variations are intended to fall within the scope of the present disclosure.

The processor 252 may be implemented as one or more general-purpose processors, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the vehicle circuit 255, the route look-ahead circuit 256, the weather circuit 257, the adjustment circuit 258, and/or the route selection circuit 259 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory 254 (e.g., RAM, ROM, Flash Memory, hard disk storage, etc.) may store data and/or computer code for facilitating the various processes described herein. The memory 254 may be communicably connected to the processor 252 to provide computer code or instructions to the processor 252 for executing at least some of the processes described herein. Moreover, the memory 254 may be or include tangible, non-transient volatile memory or non-volatile memory. Accordingly, the memory 254 may include database components, object code components, script components, or any other type of information structure for supporting the various activities and information structures described herein.

The communications interface 253 may include wired or wireless interfaces (e.g., jacks, antennas, transmitters, receivers, transceivers, wire terminals, etc.) for conducting data communications with various systems, devices, or networks. For example, the communications interface 253 may include an Ethernet card and port for sending and receiving data via an Ethernet-based communications network and/or a Wi-Fi transceiver for communicating via a wireless communications network. The communications interface 253 may be structured to communicate via local area networks or wide area networks (e.g., the Internet, etc.) and may use a variety of communications protocols (e.g., IP, LON, Bluetooth, ZigBee, radio, cellular, near field communication, etc.).

The communications interface 253 of the server 250 may facilitate communication between and among the server 250, one or more vehicle controllers 150, the route look-ahead system 210, the weather system 220, and/or the GPS system 230. Communication between and among the server 250, the one or more vehicle controllers 150, the route look-ahead system 210, the weather system 220, and/or the GPS system 230 may be via any number of wired or wireless connections (e.g., any standard under IEEE 802, etc.). For example, a wired connection may include a serial cable, a fiber optic cable, a CAT5 cable, or any form of wired connection. In comparison, a wireless connection may include the Internet, Wi-Fi, cellular, Bluetooth, ZigBee, radio, etc. In one embodiment, a controller area network (CAN) bus provides the exchange of signals, information, and/or data. The CAN bus can include any number of wired and wireless connections that provide the exchange of signals, information, and/or data. The CAN bus may include a local area network (LAN), or a wide area network (WAN), or the connection may be made to an external computer (for example, through the Internet using an Internet Service Provider).

The vehicle circuit 255 is structured to facilitate controlling communication between the server 250 and one or more of the vehicle controllers 150 (e.g., a plurality of vehicle controllers 150 associated with the vehicles 20 in a respective fleet, etc.) via the communications interface 253. By way of example, the vehicle circuit 255 may be structured to receive the operating data from the vehicle controllers 150 indicative of operating parameters of one or more components of one or more of the vehicles 20 (e.g., an engine speed, an engine torque, a vehicle speed, a transmission gear selection, an exhaust aftertreatment system temperature, a battery system temperature, etc. of a respective vehicle 20) and provide adjustment commands (e.g., the first commands, the second commands, etc.) to respective vehicle controllers 150.

The route look-ahead circuit 256 is structured to facilitate controlling communication between the server 250 and the route look-ahead system 210 via the communications interface 253. By way of example, the vehicle circuit 255 may be structured to receive or retrieve the route look-ahead data (e.g., the static information indicative of road parameters, dynamic information indicative of traffic conditions, etc. ahead of a respective vehicle 20) from the route look-ahead system 210. The weather circuit 257 is structured to facilitate controlling communication between the server 250 and the weather system 220 via the communications interface 253. By way of example, the weather circuit 257 may be structured to receive or retrieve the weather data (e.g., dynamic information indicative of weather conditions ahead of a respective vehicle 20, etc.) from the weather system 220.

The adjustment circuit 258 is structured to interpret (i) the operating data received from a respective vehicle 20 and (ii) the route look-ahead data (e.g., road parameters, traffic information, etc.) received from the route look-ahead system 210 for the respective vehicle 20 and/or the weather data received from the weather system 220 for the respective vehicle 20 to determine an adjustment for the operating parameters of one or more components of the respective vehicle 20. The adjustment circuit 258 is further structured to generate an instruction regarding an adjustment command (e.g., the first command, the second command, etc.) including the adjustment of the operating parameters for one or more components of the respective vehicle 20 to be sent to the vehicle controller 150 thereof.

According to an example embodiment, the adjustment determined by the adjustment circuit 258 includes an adjustment to an operating setpoint of one or more components of the respective vehicle 20 based on the road parameters, the traffic characteristics, and/or the weather characteristics ahead of the respective vehicle 20 to improve the expected fuel efficiency of the respective vehicle 20 relative to operation of the respective vehicle 20 if the operating setpoint of the one or more components were not changed (e.g., altered, modified, updated, improved, modulated, etc.). The adjustment circuit 258 may thereby be structured to optimize control of the powertrain (e.g., the powertrain 100, the powertrain 110, the powertrain 115, the powertrain 118, etc.) of the respective vehicle 20 in real-time based on expected conditions ahead of the respective vehicle 20 (e.g., traffic, weather, road parameters, etc.).

As an example, the traffic information retrieved by the route look-ahead system 210 may indicate that there is a traffic jam or that traffic slows ahead of the respective vehicle 20. Rather than maintaining the current speed of the respective vehicle 20 and then encountering the traffic and partaking in stop-and-go traffic or operating at a less efficient operating setpoint, which is fuel inefficient, the adjustment circuit 258 may selectively limit or recommend reducing vehicle speed based on the traffic information to minimize the amount of time the respective vehicle 20 is engaged in stop-and-go traffic or operating at the less efficient operating setpoint to increase fuel efficiency without increasing total trip time.

As another example, the road parameters retrieved by the route look-ahead system 210 may indicate a future grade change, a future speed limit change, a future road curvature, etc. The adjustment circuit 258 may be structured to determine the speed and/or transmission gear that are optimal to traverse the upcoming road parameters at a desired characteristic (e.g., miles-per-gallon more than a threshold, etc.). Such adjustment may be transmitted to the respective vehicle 20 for implementation. Further, the adjustment circuit 258 may be structured to identify an opportunistic time to perform energy intensive tasks (e.g., charging air brakes, etc.) based on the road parameters ahead of the respective vehicle 20 that minimizes energy consumption (e.g., when going downhill, etc.).

As yet another example, the road parameters retrieved by the route look-ahead system 210 (e.g., a downhill grade, etc.) may indicate a potential for the temperature of (i) an exhaust aftertreatment system and/or (ii) a battery system of the respective vehicle 20 to fall outside of a target temperature range. The adjustment circuit 258 may be structured to determine an adjustment that includes an operating setpoint for one or more of the components of the respective vehicle 20 to maintain the temperature thereof within the target temperature range.

By way of example, a road grade may force the engine to operate on max torque curve or to cut the fuel during downhill, or traffic in car following situations. Such fueling cut events may lead to cooling of the exhaust aftertreatment system (e.g., SCR bed temperature, etc.). Depending on the exhaust aftertreatment system temperature before the fuel cut event and the duration of the fuel cut event, the exhaust aftertreatment system temperature may drop outside of a desired temperature range. Such a drop in operating temperature may lead to (i) system out NOx and $NH_3$ spikes due to the low exhaust aftertreatment system temperature and (ii) low conversion efficiency when subsequent fueling events occur. Such low temperature and low conversion efficiency may force the engine to operate in a thermal management mode to increase the temperature of the exhaust aftertreatment system (e.g., to improve efficacy of the exhaust aftertreatment system, etc.). The increase in the accumulated system out NOx and the possible operation in thermal management mode may force the engine to operate in a less efficient region at normal operating conditions that causes lower brake-specific fuel consumption (BSFC) and higher fuel consumption. Therefore, the knowledge of future engine loading and, specifically, future fuel cut events and the durations associated therewith may be used to optimize engine operation. Specifically, the adjustment circuit 258 may be structured to identify events that may lead the exhaust aftertreatment system to operate outside of a desired temperature operating range and preemptively increase the temperature of the exhaust aftertreatment system. While such preemptive increase in temperature may temporarily decrease fuel efficiency, such decrease in fuel efficiency may be relatively less than the decrease in fuel efficiency if the temperature were to drop outside of the desired temperature operating range and require the engine to operate in the thermal management mode. The fuel efficiency, in the aggregate, may thereby be higher than if the preemptive increase in temperature were not conducted.

The route selection circuit 259 is structured to facilitate controlling communication between the server 250, the GPS system 230, and the vehicle controllers 150 via the communications interface 253. By way of example, the route selection circuit 259 may be structured to receive a current location and/or a desired destination for a respective vehicle 20 from the operator thereof via the operator I/O device 130. The route selection circuit 259 may then be structured to provide the current location and/or the desired destination to the GPS system 230. In some embodiments, the route selection circuit 259 and/or the GPS system 230 automatically determine the current location of the respective vehicle 20 (i.e., without input from the operator of the respective vehicle 20).

Figure 8:
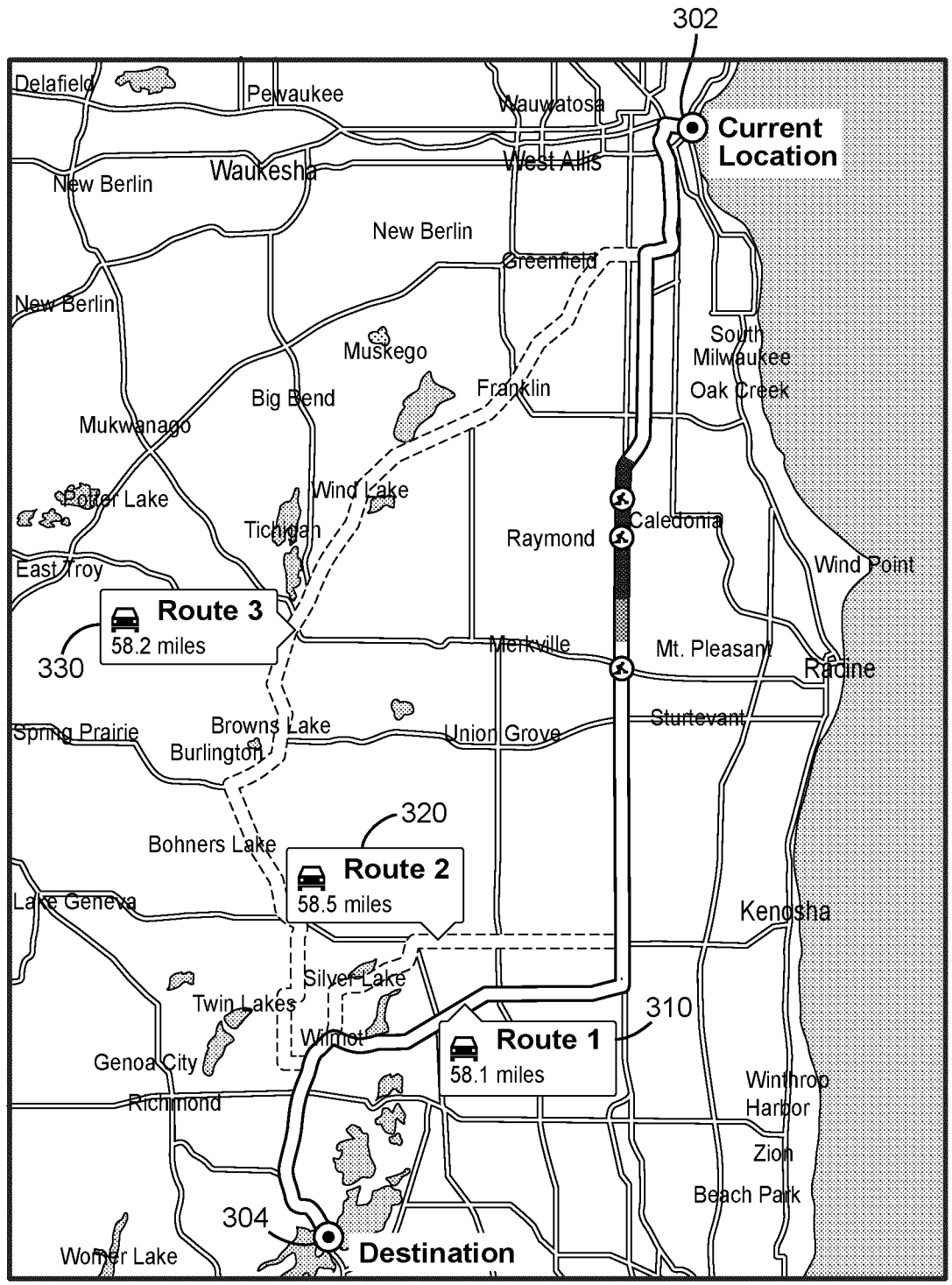
FIG. 8 is an illustration of a route selection interface having a plurality of routes, according to an example embodiment.

The route selection circuit 259 is structured to receive or retrieve the GPS data from the GPS system 230 regarding one or more possible routes between the current location and the desired location. According to the example embodiment shown in FIG. 8, the route selection circuit 259 is structured to receive GPS data indicative of one or more possible routes, shown as first route 310, second route 320, and third route 330, between a current location 302 and a desired destination 304 of the respective vehicle 20. In other embodiments, a different number of routes are provided between the current location 302 and the desired destination 304 (e.g., one, two, four, etc. routes).

According to an example embodiment, the route selection circuit 259 is structured to analyze each of the routes (e.g., the first route 310, the second route 320, the third route 330, etc.) extending between the current location 302 and the desired destination 304 based on the static information and the dynamic information (e.g., the route parameters, the traffic information, the weather information, etc.) along each route to determine an expected fuel efficiency along each route (e.g., independent of time, etc.). The route selection circuit 259 may then be structured to provide the analysis of the plurality of routes to the vehicle controller 150 of the respective vehicle 20 for display to an operator thereof (e.g., a route recommendation, etc.). The operator may then provide a selection of a desired route of travel for the vehicle 20. The adjustment circuit 258 may then be structured to provide adjustment commands, as described herein, as the vehicle 20 travels along the selected route. In some embodiments, the adjustment circuit 258, the route selection circuit 259, and/or the GPS system 230 are structured to adaptively recommend new routes that may improve the fuel efficiency of the respective vehicle 20 as the respective vehicle 20 travels along a current route.

In some embodiments, the adjustment circuit 258 and the route selection circuit 259 are structured to facilitate performing the route selection and adjustment operations ahead of time and then transmit a "route adjustment profile" to the vehicle controller 150. The route adjustment profile may then be stored by the vehicle controller 150 for future potential implementation (i.e., the adjustments are received prior to when they are determined to be implemented). In such embodiments, network connectivity is less likely to restrict implementation of the off-site determined adjustments. For example, once the route is known, the adjustment circuit 258 may be structured to determine adjustments throughout the route (e.g., based on current static and dynamic parameters along the route, based on past static and dynamic parameters along the route, etc.) and then provision a "route adjustment profile" right away so that even if there are points along the route where network connectivity is lost, it is immaterial, and the vehicle controller 150 can, therefore, implement the adjustments or recommend the adjustments to the operator absent a connection to the server 250.

Figure 9:
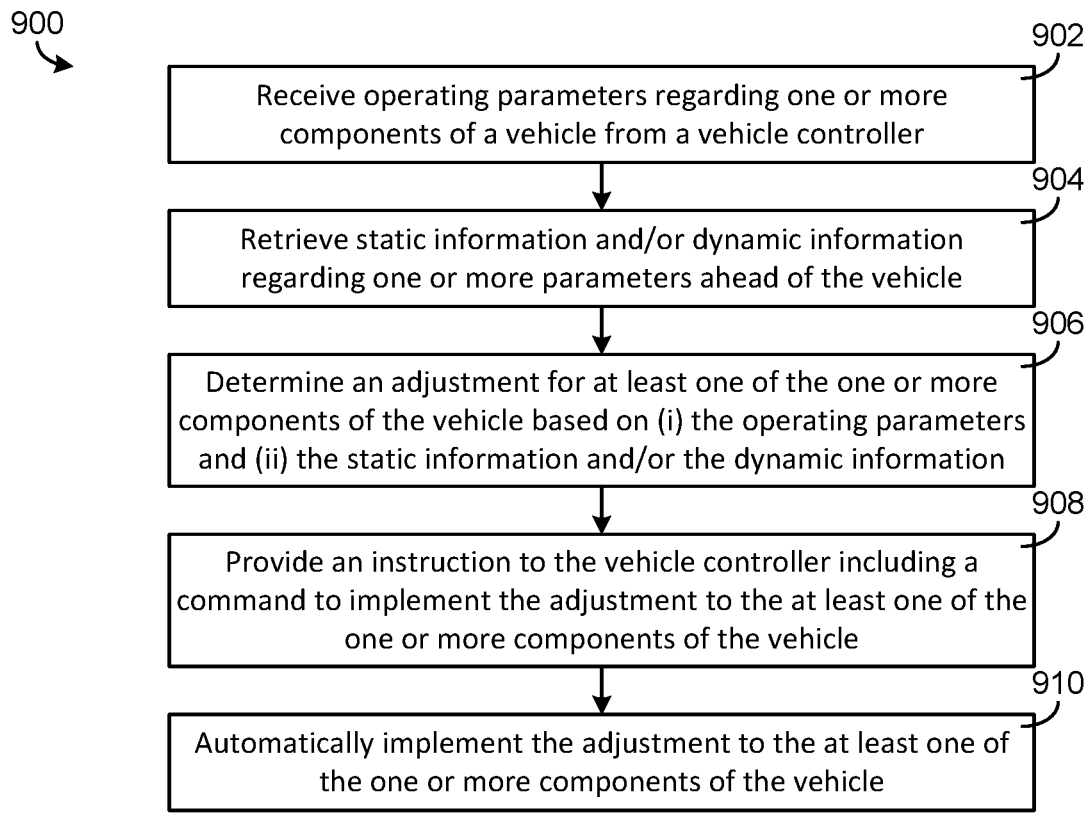
FIG. 9 is a flow diagram of a method for implementing an adjustment to a component of a vehicle, according to an example embodiment.

Referring now to FIG. 9, a method 900 for implementing an adjustment to a component of a vehicle is shown according to an example embodiment. In one example embodiment, method 900 may be implemented with the vehicle 20, the vehicle controller 150, and the server 250 of FIGS. 1-7. As such, method 900 may be described with regard to FIGS. 1-7.

At step 902, a remote server (e.g., the server 250, etc.) is structured to receive operating parameters regarding one or more components of a vehicle (e.g., the vehicle 20, etc.) from a vehicle controller (e.g., the vehicle controller 150, acquired by the sensors 140, etc.). The operating parameters may include parameters such as an engine speed, an engine torque, a vehicle speed, a transmission gear selection, an exhaust aftertreatment system temperature, and/or a battery system temperature. At step 904, the remote server is structured to retrieve static information and/or dynamic information regarding one or more parameters ahead of the vehicle (e.g., from the route look-ahead system 210, the weather system 220, the GPS system 230, etc.). The static information may include road parameters. The road parameters may include a speed limit, a road grade, and/or a road curvature ahead of the vehicle. The dynamic information may include weather information regarding weather (e.g., rain, snow, temperature, humidity, etc.) and/or traffic information regarding traffic (e.g., traffic patterns, traffic jams, traffic speeds, etc.) ahead of the vehicle.

At step 906, the remote server is structured to determine an adjustment for at least one of the one or more components of the vehicle based on (i) the operating parameters and (ii) the static information and/or the dynamic information. At step 908, the remote server is structured to provide an instruction to the vehicle controller regarding the adjustment. The instruction includes a command for the vehicle controller to implement the adjustment to the at least one of the one or more components of the vehicle. At step 910, the vehicle controller is structured to automatically implement the adjustment to the at least one of the one or more components of the vehicle in response to receiving the command from the remote server.

As an example, the adjustment may include an operating setpoint for the at least one of the one or more components of the vehicle to reduce vehicle speed based on the traffic information to increase fuel efficiency without increasing total trip time. As another example, the adjustment may include an operating setpoint for the at least one of the one or more components of the vehicle to maintain a temperature of at least one of (i) an exhaust aftertreatment system or (ii) a battery system of the vehicle in a target temperature range.

In some embodiments, the remote server is further structured to receive location information (e.g., via the operator I/O device 130, the GPS system 230, etc.) regarding a current location (e.g., the current location 302, etc.) and a destination (e.g., the desired destination 304, etc.) of the vehicle. In such embodiments, the remote server may be further structured to analyze a plurality of routes between the current location and the destination of the vehicle based on the static information and/or the dynamic information to determine an expected fuel efficiency along each of the plurality of routes. The remote server may then provide the analysis of the plurality of routes to the vehicle controller for display to and/or selection by an operator of the vehicle.

Figure 10:
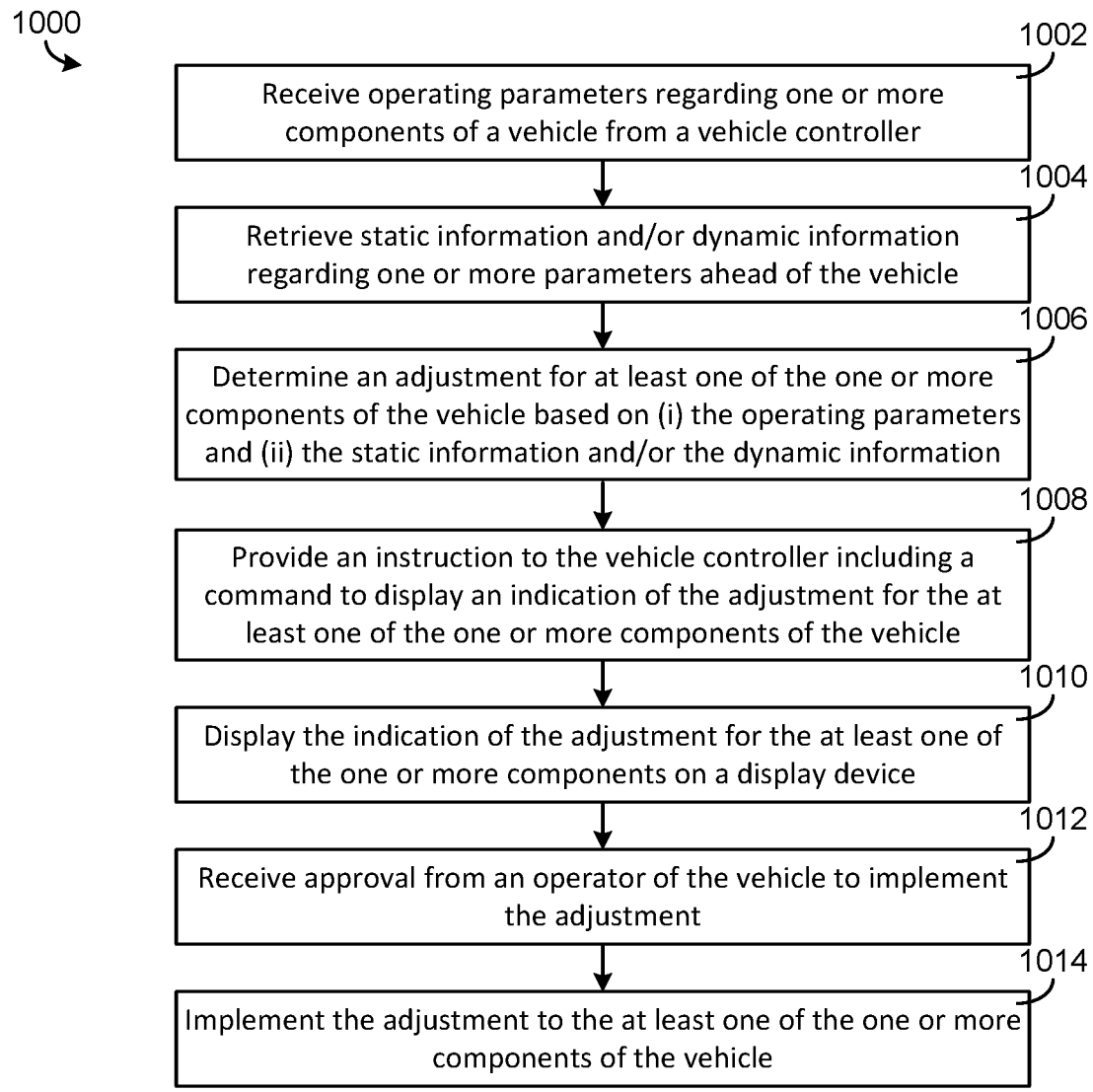
FIG. 10 is a flow diagram of a method for implementing an adjustment to a component of a vehicle, according to another example embodiment.

Referring now to FIG. 10, a method 1000 for implementing an adjustment to a component of a vehicle is shown according to an example embodiment. In one example embodiment, method 1000 may be implemented with the vehicle 20, the vehicle controller 150, and the server 250 of FIGS. 1-7. As such, method 1000 may be described with regard to FIGS. 1-7.

At step 1002, a remote server (e.g., the server 250, etc.) is structured to receive operating parameters regarding one or more components of a vehicle (e.g., the vehicle 20, etc.) from a vehicle controller (e.g., the vehicle controller 150, acquired by the sensors 140, etc.). The operating parameters may include parameters such as an engine speed, an engine torque, a vehicle speed, a transmission gear selection, an exhaust aftertreatment system temperature, and/or a battery system temperature. At step 904, the remote server is structured to retrieve or acquire static information and/or dynamic information regarding one or more parameters ahead of the vehicle (e.g., from the route look-ahead system 210, the weather system 220, the GPS system 230, etc.). The static information may include road parameters. The road parameters may include a speed limit, a road grade, and/or a road curvature ahead of the vehicle. The dynamic information may include weather information regarding weather (e.g., rain, snow, temperature, humidity, road surface conditions, etc.) and/or traffic information regarding traffic (e.g., traffic patterns, traffic jams, traffic speeds, etc.) ahead of the vehicle.

At step 1006, the remote server is structured to determine an adjustment for at least one of the one or more components of the vehicle based on (i) the operating parameters and (ii) the static information and/or the dynamic information. At step 1008, the remote server is structured to provide an instruction to the vehicle controller regarding the adjustment. The instruction includes a command for the vehicle controller to display an indication of the adjustment for the at least one of the one or more components of the vehicle.

At step 1010, the vehicle controller is structured to display the indication of the adjustment for the at least one of the one or more components on a display device (e.g., of the operator I/O device 130, etc.). At step 1012, the vehicle controller is structured to receive approval from an operator of the vehicle to implement the adjustment. At step 1014, the vehicle controller is structured to implement the adjustment to the at least one of the one or more components of the vehicle in response to receiving the approval from the operator of the vehicle. In some embodiments, the method 1000 does not includes step 1012 or step 1014, rather the operator of the vehicle may manually implement the adjustment after being notified of the recommended adjustment.

As an example, the adjustment may include an operating setpoint for the at least one of the one or more components of the vehicle to reduce vehicle speed based on the traffic information to increase fuel efficiency without increasing total trip time. As another example, the adjustment may include an operating setpoint for the at least one of the one or more components of the vehicle to maintain a temperature of at least one of (i) an exhaust aftertreatment system or (ii) a battery system of the vehicle in a target temperature range.

In some embodiments, the remote server is further structured to receive location information (e.g., via the operator I/O device 130, the GPS system 230, etc.) regarding a current location (e.g., the current location 302, etc.) and a destination (e.g., the desired destination 304, etc.) of the vehicle. In such embodiments, the remote server may be further structured to analyze a plurality of routes between the current location and the destination of the vehicle based on the static information and/or the dynamic information to determine an expected fuel efficiency along each of the plurality of routes. The remote server may then provide the analysis of the plurality of routes to the vehicle controller for display to and/or selection by the operator of the vehicle.

It should be understood that no claim element herein is to be construed under the provisions of 35 U.S.C. § 112(f), unless the element is expressly recited using the phrase "means for."

For the purpose of this disclosure, the term "coupled" means the joining or linking of two members directly or indirectly to one another. Such joining may be stationary or moveable in nature. For example, a propeller shaft of an engine "coupled" to a transmission represents a moveable coupling. Such joining may be achieved with the two members or the two members and any additional intermediate members. For example, circuit A communicably "coupled" to circuit B may signify that the circuit A communicates directly with circuit B (i.e., no intermediary) or communicates indirectly with circuit B (e.g., through one or more intermediaries).

While various circuits with particular functionality are shown in FIGS. 6 and 7, it should be understood that the vehicle controller 150 and/or the server 250 may include any number of circuits for completing the functions described herein. For example, the activities and functionalities of the various circuits may be combined in multiple circuits or as a single circuit. Additional circuits with additional functionality may also be included. Further, it should be understood that the vehicle controller 150 and/or the server 250 may further control other activity beyond the scope of the present disclosure.

As mentioned above and in one configuration, the "circuits" may be implemented in machine-readable medium for execution by various types of processors, such as the processor 152 and/or the processor 252. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, it should be understood that the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

The invention claimed is:

1. A method comprising:
receiving, by a remote server, operating parameters regarding one or more components of a vehicle from a vehicle controller of the vehicle, the one or more components including at least one of an exhaust aftertreatment system or a battery system, the operating parameters including a temperature;
retrieving, by the remote server, static information and dynamic information regarding one or more parameters ahead of the vehicle, the static information including road parameters, the dynamic information including at least one of weather information or traffic information;
performing, by the remote server, an adjustment analysis that includes determining an adjustment for at least one of the one or more components of the vehicle based on the operating parameters, the static information, and the dynamic information indicating that an upcoming event will cause the temperature of the at least one of the one or more components to operate outside of a target temperature range, wherein all of the adjustment analysis is performed by the remote server and not performed by the vehicle controller; and
providing, by the remote server, a command to the vehicle controller to implement the adjustment to the at least one of the one or more components of the vehicle such that the vehicle controller preemptively adjusts the temperature of the at least one of the one or more components in advance of the upcoming event to maintain the temperature within the target temperature range as the upcoming event is traversed.

2. The method of claim 1, wherein:
the road parameters include at least one of a speed limit, a road grade, or a road curvature ahead of the vehicle; and
the operating parameters include at least one of an engine speed, an engine torque, a vehicle speed, a transmission gear selection, an exhaust aftertreatment system temperature, or a battery system temperature.

3. The method of claim 1, further comprising displaying, by the vehicle controller on a display device of the vehicle, an indication of the adjustment for the at least one of the one or more components to an operator, wherein the operator can manually override the adjustment.

4. The method of claim 1, further comprising:
receiving, by the remote server, location information regarding a current location and a destination of the vehicle;
analyzing, by the remote server, a plurality of routes between the current location and the destination of the vehicle based on the static information and the dynamic information to determine an expected fuel efficiency along each of the plurality of routes; and
providing, by the remote server, the analysis of the plurality of routes to the vehicle controller for display to an operator of the vehicle.

5. The method of claim 1, further comprising:
receiving, by the remote server, a selected route of travel for the vehicle; and transmitting, by the remote server, a route adjustment profile to the vehicle controller for the selected route;

wherein the route adjustment profile includes a plurality of adjustments for implementation along the selected route; and wherein the route adjustment profile facilitates the vehicle controller in implementing each of the plurality of adjustments at an appropriate time along the selected route or recommending each of the plurality of adjustments at the appropriate time along the selected route absent a connection to the remote server at the appropriate time.

6. A control system for a vehicle, the control system comprising:
a vehicle controller installable on the vehicle; and
a remote server;
wherein:
the vehicle controller is structured to acquire an operating parameter regarding a component of the vehicle, the component including at least one of an exhaust aftertreatment system or a battery system, the operating parameter including a temperature;
the vehicle controller is structured to transmit the operating parameter to the remote server;
the remote server is structured to acquire static information regarding a road parameter ahead of the vehicle and dynamic information regarding at least one of weather information or traffic information ahead of the vehicle;
the remote server is structured to perform an adjustment analysis to determine an adjustment for the component of the vehicle based on the operating parameter, the static information, and the dynamic information indicating that an upcoming event will cause the temperature of the component to operate outside of a target temperature range, wherein all of the adjustment analysis is performed by the remote server and not performed by the vehicle controller; and
the remote server is structured to transmit a command to the vehicle controller to implement the adjustment to the component of the vehicle such that the vehicle controller preemptively adjusts the temperature of the component in advance of the upcoming event to maintain the temperature within the target temperature range as the upcoming event is traversed.

7. The control system of claim 6, wherein the vehicle controller is structured to display an indication of the adjustment for the component on a display device of the vehicle, and wherein an operator can manually override the adjustment.

8. The control system of claim 6, wherein the remote server is structured to:
acquire location information regarding a current location and a destination of the vehicle;
analyze a plurality of routes between the current location and the destination of the vehicle based on the static information and the dynamic information to determine an expected fuel efficiency along each of the plurality of routes; and
transmit the analysis of the plurality of routes to the vehicle controller for display on a display device of the vehicle.

9. The control system of claim 6, wherein:
the remote server is structured to receive a selected route of travel for the vehicle;
the remote server is structured to transmit a route adjustment profile to the vehicle controller for the selected route;
the route adjustment profile includes a plurality of adjustments for implementation along the selected route; and
the route adjustment profile facilitates the vehicle controller in implementing each of the plurality of adjustments at an appropriate time along the selected route or recommending each of the plurality of adjustments at the appropriate time along the selected route absent a connection to the remote server at the appropriate time.

10. A method comprising:
acquiring, by a remote server, an operating parameter regarding a component of a vehicle, the component including at least one of an exhaust aftertreatment system or a battery system, the operating parameter including a temperature;
acquiring, by the remote server, static information regarding a road parameter ahead of the vehicle;
acquiring, by the remote server, dynamic information regarding at least one of weather information or traffic information;
determining, by the remote server, an adjustment for the component of the vehicle based on the operating parameter, the static information, and the dynamic information indicating that an upcoming event will cause the temperature of the component to operate outside of a target temperature range; and
transmitting, by the remote server, a command to the vehicle controller to implement the adjustment to the component of the vehicle such that the vehicle controller preemptively adjusts the temperature of the component in advance of the upcoming event to maintain the temperature within the target temperature range as the upcoming event is traversed.

* * * * *